United States Patent [19]

Staats

[11] 3,954,024
[45] May 4, 1976

[54] AUTOMATIC ADAPTIVE CENTERING APPARATUS FOR ELECTRICALLY SUPPORTED INERTIAL INSTRUMENTS

[75] Inventor: Robert C. Staats, Largo, Fla.

[73] Assignee: Honeywell Inc., Minneapolis, Minn.

[22] Filed: Oct. 25, 1974

[21] Appl. No.: 518,028

[52] U.S. Cl. ............................. 74/5.41; 74/5.6 D; 308/10
[51] Int. Cl.² ..................................... G01C 19/30
[58] Field of Search ................. 308/10; 74/5 R, 5.4, 74/5.6 D, 5.7, 5.41

[56] References Cited
UNITED STATES PATENTS

| | | | |
|---|---|---|---|
| 3,566,700 | 3/1971 | Staats | 74/5 R |
| 3,619,014 | 11/1971 | Quick | 74/5 R |
| 3,642,334 | 2/1972 | Atkinson | 308/10 |
| 3,697,143 | 10/1972 | Klinchuch | 74/5 R |
| 3,902,374 | 9/1975 | Hoffman et al. | 74/5.6 D |

Primary Examiner—Samuel Scott
Assistant Examiner—F. D. Shoemaker
Attorney, Agent, or Firm—Albin Medved; Henry L. Hanson

[57] ABSTRACT

Apparatus for centering the inertial member of a gyroscope or an accelerometer wherein the member is maintained in suspension by means of electric fields between electrodes. Three pairs of electrodes are provided, each pair positioned to apply forces on the inertial member along one of three orthogonal axes and each being energized by an electronic channel. A dither signal is introduced into one of the channels. If the inertial member is not perfectly centered between the support electrodes, cross-coupling of electric forces between the channels will occur. Therefore, miscentering of the inertial member will result in appearance of signals in the other two channels corresponding to the dither signal introduced into the first channel. The polarity and the amplitude of such signals are indicative of the direction and the magnitude of miscentering and provide the information which is fed back into the suspension servo to close an automatic adaptive precision centering loop.

4 Claims, 7 Drawing Figures

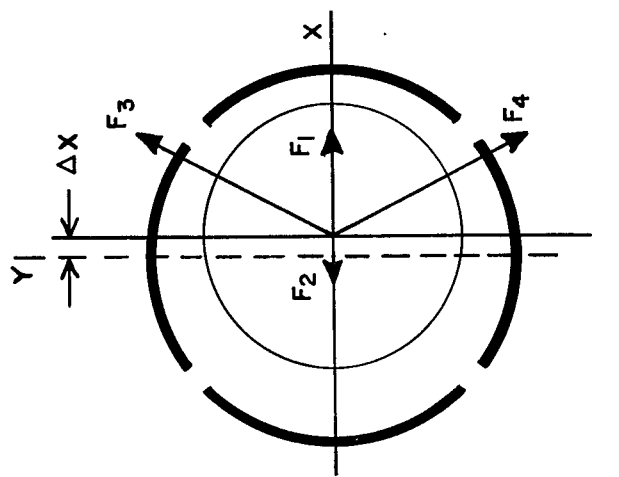
FIG. 2c  TRANSLATED ALONG +x
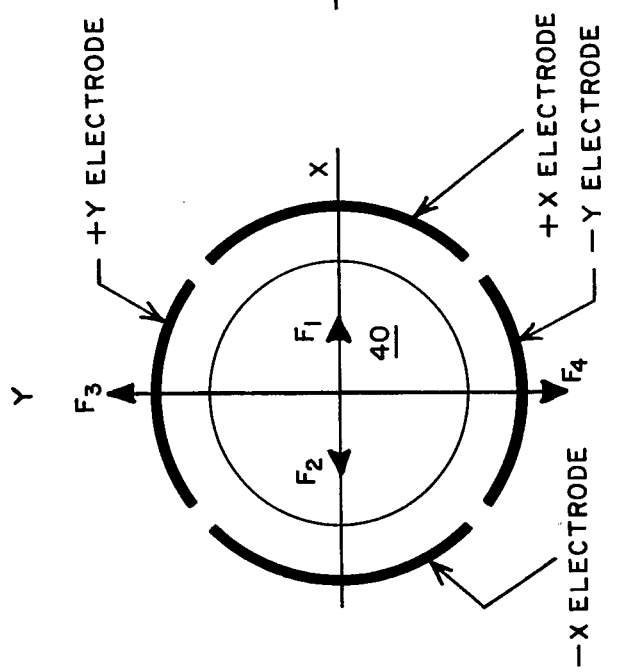
FIG. 2b  CENTERED
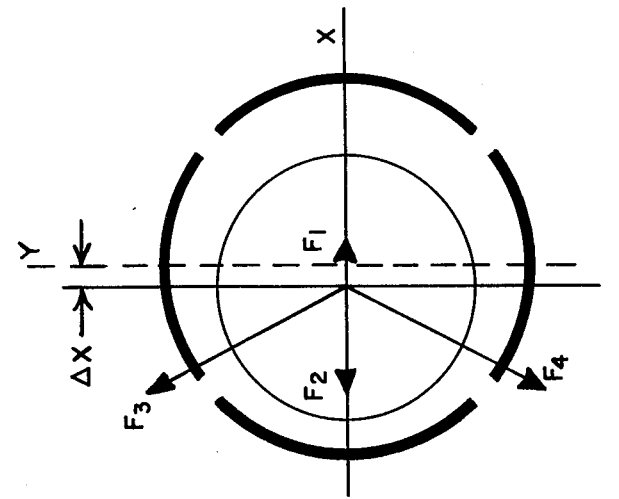
FIG. 2a  TRANSLATED ALONG −x

3,954,024

AUTOMATIC ADAPTIVE CENTERING APPARATUS FOR ELECTRICALLY SUPPORTED INERTIAL INSTRUMENTS

BACKGROUND OF THE INVENTION

1. Field of the Invention

The present invention pertains to inertial instruments and more particularly to gyroscopes and accelerometers whose inertial members are supported by means of electric fields.

2. Description of Prior Art

The advantages of electric field suspension of inertial members for gyroscopes and accelerometers has been widely recognized over the past 15 years. By maintaining the rotating inertial member free of physical contact with its support, friction normally associated with bearings is virtually eliminated. The accuracy and the life of the inertial instrument can thus be greatly increased.

An early example of an electric field suspension for a gyroscope is illustrated by U.S. Pat. No. 3,003,356, issued in Oct. 1961 to Nordsick. Other U.S. patents illustrative of such support are U.S. Pat. Nos. 3,412,618, 3,469,457, and 3,262,327, all assigned to the present assignee.

The optimum performance of an inertial instrument employing electric field suspension can be achieved if the inertial member is a perfect sphere and if further it is maintained centered precisely at the center of the electrode support structure. In an electric support system of the type utilized in the apparatus of the present invention, the electric fields are established by a set of electrodes forming a spherical envelope about the inertial member. Three pairs of electrodes are provided, each pair being associated with one channel and being responsible for generating electric support field along one of three orthogonal axes. In the prior art electric suspension systems, the spherical inertial member is quite often displaced from the center of the spherical envelope because it has previously not been possible to accurately determine the precise center. This miscentering of the inertial member results in torques on the inertial member which produce undesired drifts.

SUMMARY OF THE INVENTION

Apparatus in which the present invention is utilized is one wherein a spherical conductive sphere is suspended by electrical fields between three pairs of electrodes. Each pair of the electrodes is associated with a suspension servo loop which generates electrical signals necessary to control the position of the spherical member along one of three orthogonal axes. The inertial member is positioned between the two electrodes of each pair and is restrained by electric force at a position centered between the two electrodes. The suspension forces created by the three suspension servo channels cannot be cross-coupled between axes so long as the inertial member is centered between the electrodes. If, however, the inertial member is miscentered along an axis, the suspension electric fields from the other axes apply force components to the inertial member in the direction of the miscenter. The magnitude of these cross-coupled forces contains the information as to the degree of miscenter of the inertial member, provided, it can be separated from other effects. Signal modulation and coherent detection enables separation of the miscenter information, which is then fed back into the suspension servo to close an automatic adaptive precision centering loop.

The present invention, therefore, utilizes the cross-coupled components of the negative elastic restraint force to locate the center position for the inertial member. Briefly, the method is as follows. A small periodic electric dither force variation is injected into one axis of the suspension servo by summing an electrical dither signal into the electrode drive amplifiers of the suspension servo loop associated with that axis. Because of the basic square law relationship between individual electrode charge and force, a dither force variation will occur in that axis at twice the frequency of the applied dither signals. A component force, varying at twice the frequency of the electrical dither signal, will cross-couple into each of the other two axes, proportional to the miscentering of the inertial member along these other axes. The suspension servo loops for these other axes must rebalance the cross-coupled input force, consequently electrical signals will be present within these loops which are proportional in amplitude to the miscentering along these axes. These signals will be periodic at twice the applied electrical dither input frequency. Synchronous detection of the cross-coupled second harmonic signals provides a means of separating out the centering information from other effects.

According to the present invention, therefore, it is this technique of injecting electrical charge dither in one axis and sensing the cross-axes resultant second harmonic signals, that enables location of the precise center position of the inertial member. Except for interelectrode capacitive unbalance, which is inherently small, there is no direct electrical coupling between the three orthogonal axes of the electric suspension system. Coupling can only arise through the relationship of the applied force and servo rebalance. When the inertial member is centered, there is no dither force to rebalance. The method utilized by the present invention is nearly error free and extremely stable.

Since application of a dither signal in the suspension servo loop of one axis provides centering information for two axes, it is only necessary to introduce the dither signal in the suspension servo loops for two axes to obtain complete centering information for all three axes. Redundant information will exist for one of the axes. In applications where the inertial member is caused to spin about an axis essentially colinear with one of the three orthogonal axes associated with the suspension servo system, the drift of the inertial member results only from a miscentering in the two axes perpendicular to the spin axis. In such applications, the dither signal needs to be introduced into only one suspension servo loop.

The method of centering the inertial member disclosed herein is not dependent upon any circuit parameters external to the structure of the inertial member and the supporting electrodes and does not require any absolute measurements. In contrast to the usual capacitance bridge balance centering methods utilized by prior art, the operation of the present invention is unaffected by component drift, aging, or temperature. It is also unique in that the center so established is theoretically identical to the center at which electric torques are minimized. With the present invention, absolute centering to about one micro inch is possible, with stability of center to better than 0.1 micro inch.

It is therefore an object of the present invention to provide an improved electric suspension system for inertial instruments.

A more specific object of the present invention is a means for accurate centering of an inertial member at the intersection of three orthogonal axes along which electrical forces are applied to restrain said inertial member.

These and other objects will become more apparent to those skilled in the art upon examination of the following drawings, specification, and claims.

BRIEF DESCRIPTION OF THE DRAWINGS

FIG. 2A, 2B, 2C is a schematic illustration of forces generated between the inertial member and the supporting electrodes and the changes in such forces due to translation of the inertial member;

DESCRIPTION OF THE PREFERRED EMBODIMENT

Figure 1:
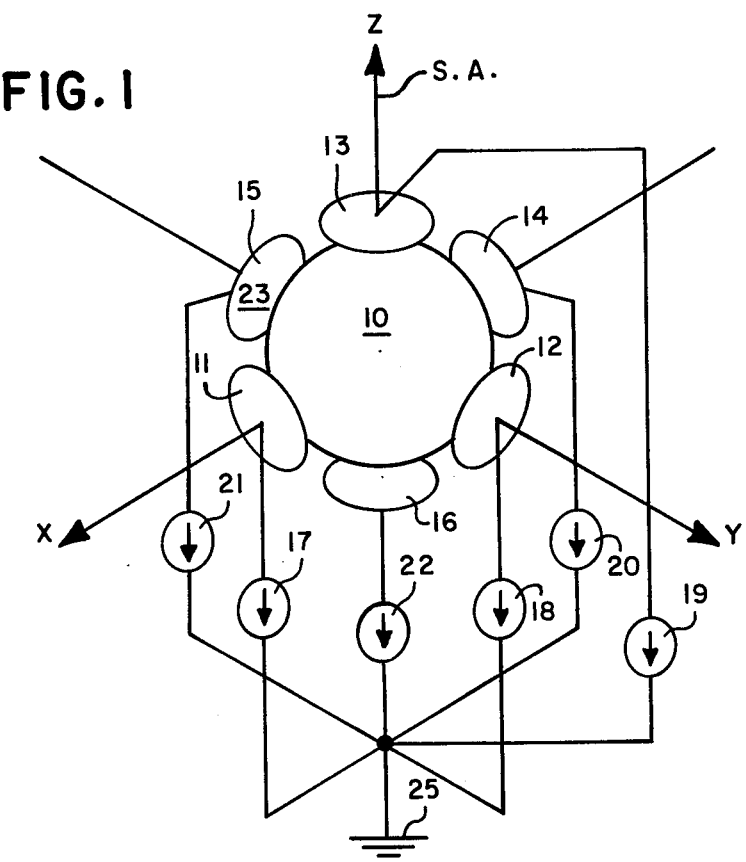
FIG. 1 is a schematic representation of an electric field suspension system for an inertial instrument wherein the present invention will find application.

Referring now to FIG. 1, a spherical inertial member 10 is surrounded by six electrically isolated electrodes 11, 12, 13, 14, 15 and 16, outlining a spherical cavity 23 with a radius somewhat larger than the radius of inertial member 10. Charge generators 17, 18, 19, 20, 21 and 22 are connected to electrodes 11, 12, 13, 14, 15 and 16 at ground 25 respectively.

Electrodes 11 and 14, 12 and 15, 13 and 16 each form an electrode pair with the two electrodes of each pair being diametrically opposed so that a straight line joining the geometric centers of the two electrodes of each pair passes substantially through the center of electrode cavity 23. The three axes of the three pairs of electrodes are substantially orthogonal to each other and intersect each other at the center of electrode cavity 23. The three axes are labeled X, Y and Z, the X axis being associated with electrodes 11 and 14, the Y axis being associated with electrodes 12 and 15, and the Z axis being associated with electrodes 13 and 16. The field created between each electrode and inertial member 10 by the respective charge generators is controlled so as to continually force inertial member 10 towards the center of electrode cavity 23. An example of the electric suspension system of the type wherein the present invention will be particularly useful can be found in Staats Pat. No. 3,469,457, issued on Sept. 30, 1969.

Translation of inertial member 10 from the electrode cavity center, along any axis, causes negative elastic restraint force in the direction of the translation. The force arises from the wrapping effect of the spherical geometry. This effect causes negative elastic restraint in two ways. The first is self-coupling of force within the axis of translation and the second is cross-coupling of forces in the axes orthogonal to the axis of translation.

The action of the self-coupling and the cross-coupling forces between the inertial member and the supporting electrodes can be best understood with reference to FIG. 2. Considered first is the case of the self-coupled forces. FIG. 2b shows an inertial member 40 centered between +Y and −Y electrodes located on the Y axis and the +X and −X electrodes located on the X axis. Assume that the electrical energy applied to the X electrodes is such that equal electric forces $F_1$ and $F_2$ act on the inertial member 40 along the +X and −X directions respectively. No net force is applied to the inertial member since the forces are balanced. If the inertial member is translated to the left, in the direction of the −X axis, as illustrated in FIG. 2a, the gap between the inertial member and the −X electrode is decreased by an amount which is a function of the translation $\Delta X$. Because of the square law relationship between force and electric field gradient, force $F_2$ along the −X axis will be increased. At the same time, the gap between inertial member 40 and the +X electrode is increased by a corresponding amount, and the force $F_1$ along the +X axis is decreased. The net force ($F_2-F_1$) is self-coupled to inertial member 40 in the direction of the −X axis. The translation of inertial member 40 in the opposite direction, along the +X axis, it illustrated by FIG. 2c. Again, a net self-coupling force is generated in this case, in the direction of the +X axis.

The magnitude of the self-coupled force is dependent upon the output impedance of the electrode drive amplifiers. It is largest for low impedance (constant voltage) drive and smallest for high impedance (constant current or constant charge) drive. In the preferred embodiment of the present invention, constant current or constant charge drive is utilized and, therefore, the net self-coupled force is relatively small.

The cross-coupled force is essentially independent of the electrode drive amplifier output impedance. Referring again to FIG. 2b, when +Y and −Y electrodes are energized so that inertial member 40 is pulled by equal forces $F_3$ and $F_4$ in the directions of +Y and −Y axes respectively, no net force exists on the inertial member. Translation of inertial member 40 along the −X axis, as shown in FIG. 2a, results in a decreased gap between the inertial member and the −X electrode. At the same time, the gap between inertial member 40 and the +X electrode is increased. The average gap between inertial member 40 and the +Y and −Y electrodes, respectively, is essentially unchanged. The potentials on the +Y and −Y electrodes are therefore essentially unchanged regardless of the electrode drive amplifier source impedances. Hence, whatever force effects are produced must also be independent of the drive amplifier source impedance. While the average gap is essentially unchanged, the translation of the inertial member in the direction of the −X axis decreases the gap between the inertial member and the +Y and −Y electrodes on the −X axis side, while it increases the gap between the Y electrodes and the inertial member on the +X axis side. The local gradient in the area of the smaller gap is larger than the local gradient in the area of the larger gap. Stronger pull is exerted on the inertial member in the small gap region than in the larger gap region, according to the square law relationship of gradient to force. As a result, the action lines of forces $F_3$ and $F_4$ are rotated in the direction of the largest gradient. The component forces of $F_3$ and $F_4$ will therefore pull on inertial member 40 in the −X direction.

Similarly, when the inertial member is translated in the +X direction, as shown in FIG. 2c, component forces of $F_3$ and $F_4$ will pull the inertial member in the direction of +X. The cross-coupled force is always in the direction of the miscenter.

In an electric suspension system wherein electrode excitation amplifiers function in a constant current or constant charge mode, the self-coupled component of the negative elastic restraint force is too small to be useful. It is, therefore, necessary to use the cross-coupled component to locate the center of the electrode cavity. It has been shown that the self-coupled component could be increased by shunting down the output charge drive impedance. However, this is undesirable because it increases electric torque effects and degrades the performance of the basic suspension servo. Additionally, stray electrode to ground capacitance unbalance causes first order centering errors. Centering, based on cross-coupled force, is not affected by stray capacitance to ground. In fact, it provides a nearly error-free centering measurement.

Figure 3:
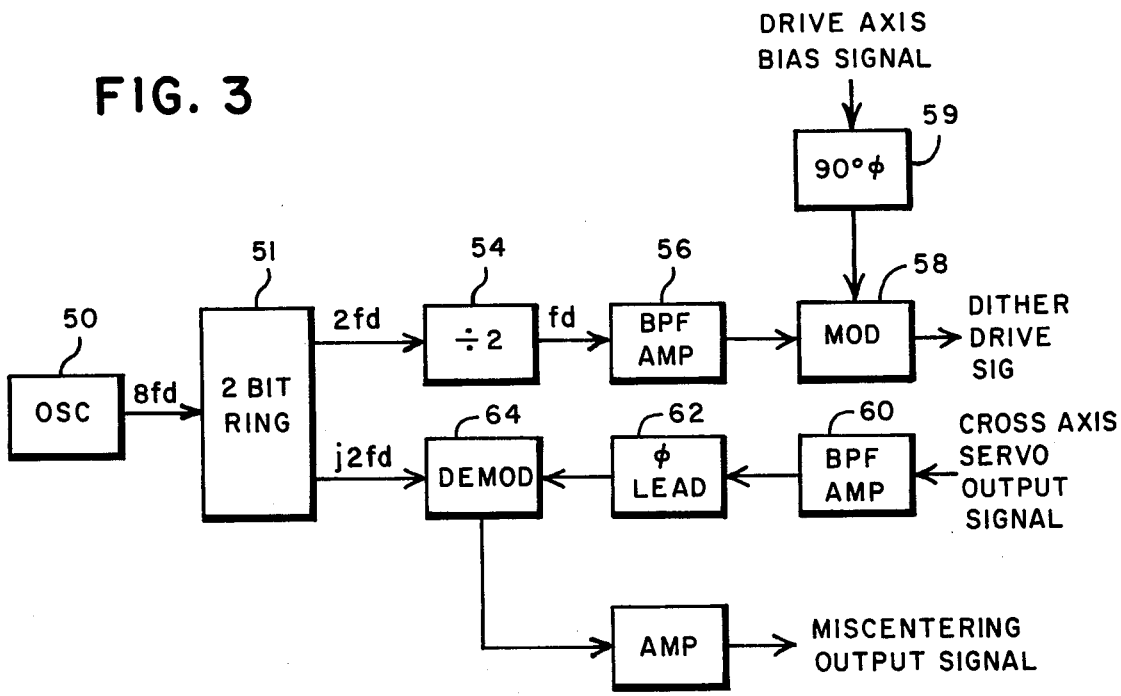
FIG. 3 is a schematic block diagram of a bias dither centering mechanism according to the present invention.

FIG. 3 illustrates the apparatus for generating the bias dither signal to be fed into the suspension servo loop of one axis (hereinafter referred to as the drive axis) and for generating a signal indicative of the miscentering of the inertial member along a second axis (hereinafter referred to as the cross-axis). An oscillator 50 drives a two-bit ring 51 which, in turn, provides first and second output signals which are phase displaced from each other by 90°. One output ($2fd$) is divided by two by dividing network 54 to form the fundamental dither drive frequency $fd$. The other output ($j2fd$) is in quadrature with the first output of two-bit ring 51 and supplies the reference input for a demodulator described below.

The fundamental dither frequency $fd$ at the output of divider network 54 is applied to a band pass amplifier 56, tuned to the fundamental frequency $fd$. The amplified signal is then applied to one input of a linear modulator 58. Modulator 58 has a second input for receiving a portion of the drive axis bias signal phase shifted 90°. The output signal of modulator 58 is a dither drive signal which is then summed differentially with the original bias signal input to each of the drive axis amplifiers, as shown and explained below with reference to FIG. 5. The modulated bias (dither drive signal) applied to one of the drive electrodes in the drive axis is in quadrature with its original bias, while the dither drive signal applied to the other electrode in the drive axis is in negative quadrature with its original bias. The bias modulation variation in the drive axis is of the form $\sin \omega_d t$. Because of the square law relation between charge and force, the bias force variation cross-coupled into each of the cross-axes is of the form $\sin^2 \omega_d t$. This can be expanded to give:

$$\sin^2 \omega_d t = 1/2(1-\cos 2\omega_d t)$$

From the equation it is evident that the force variation in the cross-axes is at twice the frequency of the dither signal and is phase shifted by 90°. The phasing and the frequency of the cross-coupled force will be ($j2fd$), which is exactly the same as the quadrature output signal of the two-bit ring 51.

The output from the suspension servo channel of one of the cross-axes is applied to the input of a band pass amplifier 60, which is tuned to the second harmonic of the dither frequency. This signal is then phase shifted in lead network 62 to compensate for the servo loop phase lag and is applied to a first input of a demodulator 64. At a second input, demodulator 64 receives a reference signal from two-bit ring 51, i.e. the quadrature signal $j2fd$. The output of demodulator 64 provides a signal which is proportional to the cross-axis miscentering, the sign of the signal indicating the direction of the miscenter. This signal can be displayed for informational purposes, or can be summed back to the cross-axis suspension servo loop to close an automatic adaptive centering control loop.

Figure 4:
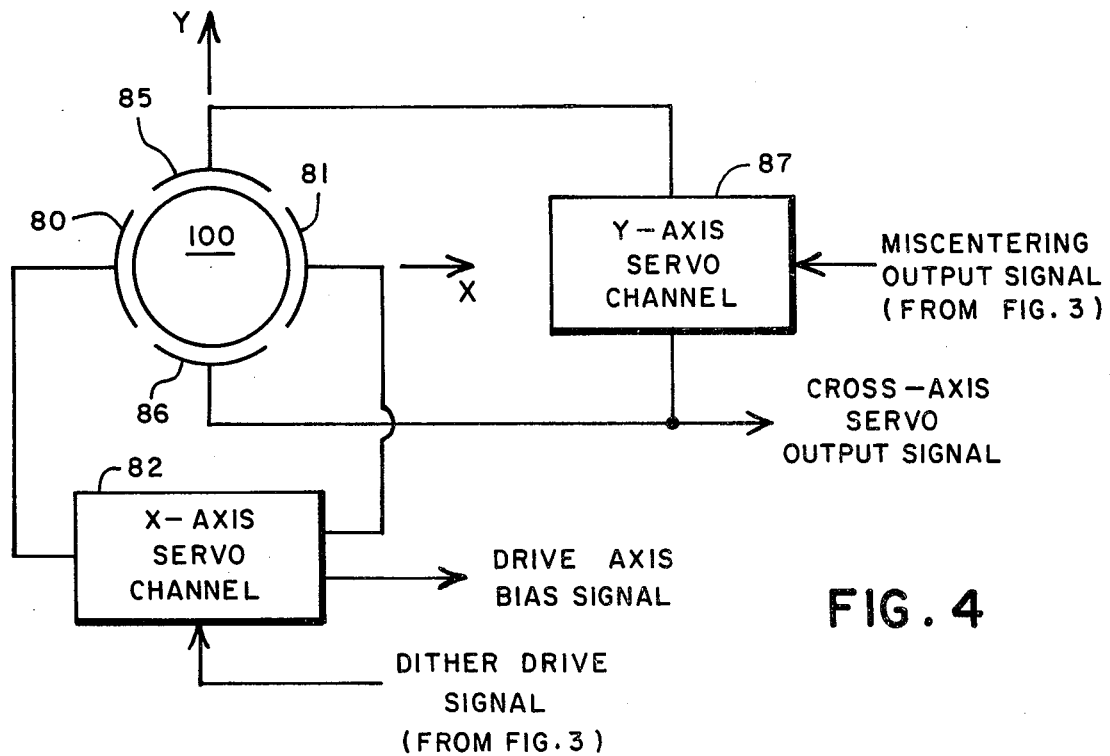
FIG. 4 is a schematic diagram of a suspension system with two suspension servo channels, illustrating the manner of connecting automatic centering apparatus according to the present invention.

FIG. 4 illustrates an electric suspension system with two suspension servo channels, one acting along the X axis and the other along Y axis. A first pair of electrodes 80 and 81 are energized by the X-axis servo channel 82 to control the forces acting on inertial member 100 along the X axis. A second pair of electrodes 85 and 86 are energized from a Y-axis servo channel 87 to control the forces acting on inertial member 100 along the Y axis. For the purposes of explaining the operation of the automatic centering apparatus along one axis, the X axis has been selected as the drive axis and the Y axis has been selected as the cross axis. The drive axis bias signal, which is applied to the input of phase shift network 59 of FIG. 3 is obtained from the X-axis servo channel 82, as further explained below in connection with FIG. 5. The cross-axis servo output signal, which is applied to the input of band pass amplifier 60 in FIG. 3 is obtained from the output of the Y-axis servo channel 87. The dither drive signal is applied to the input of X-axis servo channel 82. As explained previously, this results in the cross-coupling of forces into the Y-axis if inertial member 100 is miscentered along the Y axis. The presence of a component in the cross-axis servo output signal which is related to the dither drive signal is, therefore, an indication that inertial member 100 is miscentered. The phase of the signal and its amplitude are indicative, respectively, of the direction and the magnitude of the miscentering. The cross-axis servo output signal is processed in the manner explained in connection with FIG. 3, to generate a miscentering output signal, which is then fed back to the Y-axis servo channel to reposition inertial member 100 at the precise center of the electrode cavity.

In the example of FIG. 4, the dither signal has been applied to X-axis servo channel 82 to provide miscentering information along the Y axis. This same dither signal will also provide centering information for the Z-axis (not shown in FIG. 4). The application of a dither signal in the suspension servo loop of one axis provides centering information for two axes. For a three axis suspension system, it is, therefore, only necessary to introduce the dither signal in the suspension servo loops for two axes to obtain complete centering information for all three axes.

Figure 5:
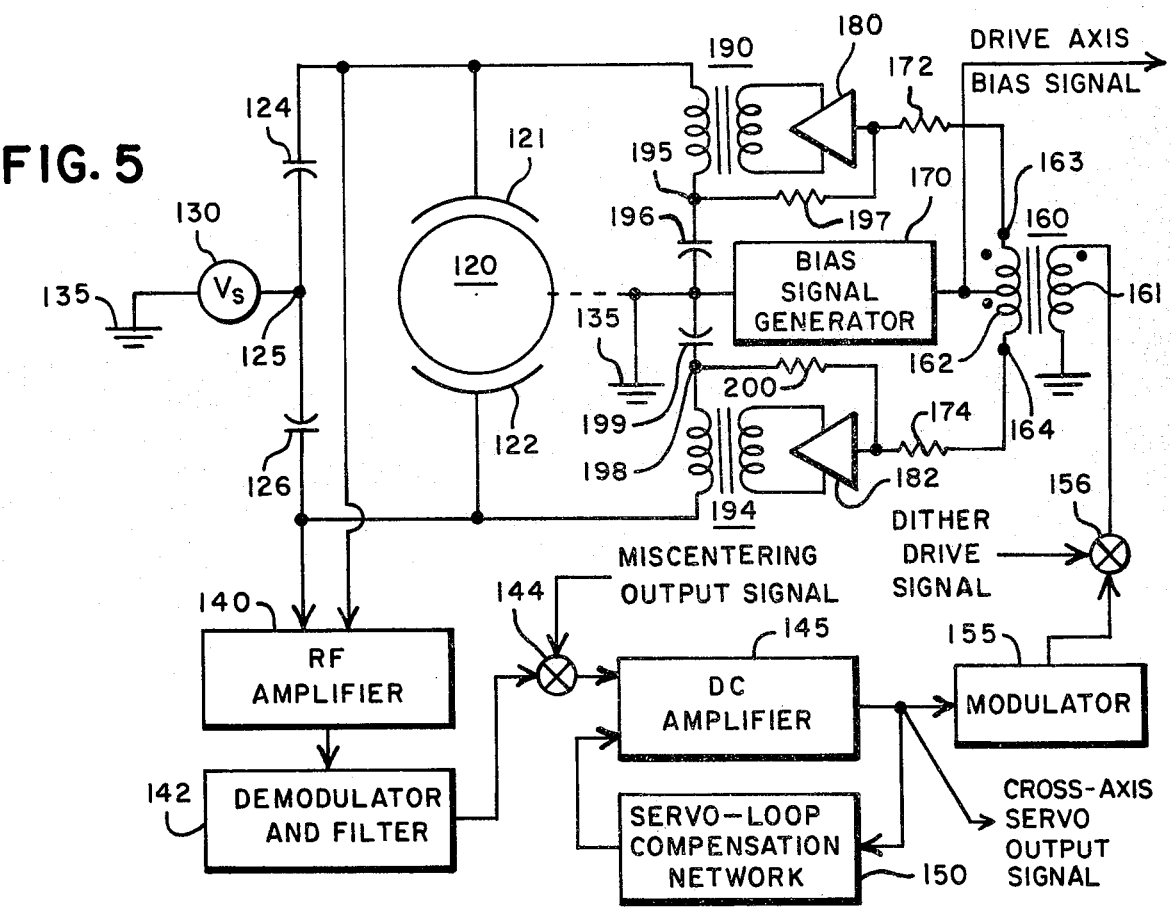
FIG. 5 is a schematic circuit diagram of a typical suspension servo channel for a suspension system with automatic centering apparatus according to the present invention.

A typical suspension servo channel for a suspension system, wherein the present invention will find use, is illustrated in FIG. 5. Three such channels will be required for a complete system.

In FIG. 5, an inertial member 120 is supported along an axis between a pair of electrodes 121 and 122. Electrode 121 is connected to one end of a capacitor 124, the other end of which is connected to a junction point 125, while electrode 122 is connected to one end of a capacitor 126, the other end of which is also connected to junction point 125. An alternating voltage source 130 is provided and connected between junction point 125 and ground potential terminal 135. Electrodes 121 and 122 each form a capacitor with conductive spherical inertial member 120. The two capacitors formed by electrodes 121 and 122 with member 120, in combination with capacitors 124 and 126, form a capacitance bridge.

The voltage across this bridge is sensed between electrodes 121 and 122 by an RF amplifier 140, wherein it is amplified and supplied to the input of a demodulator and filter 142. The output of demodulator and filter 142 will then be a DC signal indicative of the voltage amplitude between electrodes 121 and 122. The DC signal from demodulator 142 is applied to an input of a DC amplifier 145. In accordance with the present invention, the miscentering output signal (see FIG. 3) is summed with the signal at the output of demodulator 142 at a summing network 144. A servoloop compensation network 150 is connected between the output and the input of DC amplifier 145 to establish the gain and provide appropriate compensation for the servo loop.

The output of DC amplifier 145 is applied to the input of a modulator 155, the output of which is a time varying signal which is applied to the primary winding 161 of a transformer 160. The dither drive signal for the operation of the automatic centering apparatus (see FIGS. 3 and 4) is inserted at this point. It is summed with the output signal of modulator 155 at the summing network 156.

Transformer 160 has a center tapped secondary winding 162, having end terminals 163 and 164. The center tap of secondary winding 162 is connected to receive the output of a bias signal generator 170.

End terminal 163 of secondary winding 162 is connected to the input of a charge amplifier 180 (a high impedance drive amplifier) through a resistor 172, and end terminal 164 is connected to the input of a charge amplifier 182 through a resistor 174. Charge amplifiers 180 and 182 generate a charge in response to the signal at their inputs and transfer the charge thus generated to electrodes 121 and 122 by means of transformers 190 and 194 respectively. The primary winding of transformer 190 is connected to the output of amplifier 180, while its secondary winding is connected between electrode 121 and a junction point 195. A capacitor 196 is connected between junction point 195 and ground potential terminal 135 and a resistor 197 is connected between junction point 195 and the input of amplifier 180. The primary winding of transformer 194 is connected to the output of amplifier 182, while its secondary winding is connected between electrode 122 and a junction point 198. A capacitor 199 is connected between junction point 198 and ground terminal 135 and a resistor 200 is connected between junction point 198 and the input of amplifier 182.

In a three phase suspension system of the type illustrated in U.S. Pat. No. 3,469,457 and of the type contemplated herein, the inertial member is maintained at a virtually ground potential. This is illustrated by a dotted line connection between inertial member 120 and ground terminal 135.

When inertial member 120 is not subjected to any acceleration forces, bias signal generator 170 applies equal signals to each of amplifiers 180 and 182, which in turn transfer electric charges of equal magnitude to electrodes 121 and 122. Under such condition, inertial member 120 is pulled with equal force toward both electrodes. Subjecting inertial member 120 to an external acceleration force, with a component along the axis of electrodes 121 and 122, produces an error signal at the input of RF amplifier 140. Through the action of RF amplifier 140, demodulator 142, DC amplifier 145, and modulator 155, a suspension control voltage is generated across primary winding 161 of transformer 160. This suspension control voltage is superimposed on the signal generated by bias signal generator 170 and applied to the secondary winding 162 of transformer 160. The suspension control voltage appearing in primary winding 161 adds to the signal in one half of the secondary winding 162, while it subtracts from the signal in the other half of secondary winding 162, depending upon its polarity. The polarity of the control voltage on primary winding 161, in turn, depends on the direction of the capacitance bridge unbalance. The action of the suspension control voltage is to provide differential forces on inertial member 120 to maintain the inertial member substantially at the center of the electrode cavity.

The drive axis bias signal for application at the input of phase shift network 59 of FIG. 3 is obtained from the center tap of secondary winding 162 of transformer 160 in the drive channel (see also FIG. 4). The cross-axis servo output signal to be applied to the input of band pass amplifier 60 of FIG. 3 is obtained from the output of DC amplifier 145 in the cross-axis channel.

Variations in capacitance in the capacitance bridge caused by changes in temperature or other factors, can result in errors such that inertial member 120 will not be maintained at the precise center of the electrode cavity. The automatic centering apparatus of the present invention is provided to compensate for these errors and assure better accuracy in the centering of the inertial member.

While the description of the invention herein was mad with reference to a suspension system comprised of three channels of the type illustrated by FIG. 5, it will be understood by those of skill in the art that such description was intended only as an example and that there are other ways of implementing the present invention without departing from its scope and spirit.

I claim:

1. In an inertial instrument wherein an electrically conductive inertial member is supported within a cavity defined by a plurality of pairs of electrically isolated electrodes including a first pair and a second pair, the two electrodes of each said pair being positioned at diametrically opposite locations with respect to said cavity and wherein a plurality of suspension servo channels are provided, including first and second suspension servo channels, for supplying electric charge to said plurality of pairs of electrodes, respectively, to maintain said inertial member suspended between said electrodes substantially at the center of said cavity, means for compensating for errors in the centering of said inertial member comprising:

means for generating a dither signal of a predetermined frequency and superimposing said dither signal upon the electric charge supplied by said first suspension servo channel;

means for detecting at the output of said second suspension servo channel, the presence of an error signal produced by cross-coupling of said dither signal; and means for receiving said error signal from said second suspension servo channel and providing a feedback to said second suspension servo channel so as to control the electric charge provided by said second suspension servo channel to said second pair of electrodes and thereby recenter said inertial member.

2. In an inertial instrument wherein an electrically conductive inertial member is supported within a cavity defined by first, second and third pairs of electrically isolated electrodes, the two electrodes of each said pair being positioned at diametrically opposite locations with respect to said cavity and centered on one of three mutually perpendicular axes and wherein first, second, and third suspension servo channels are provided for supplying electric charge to said first, second, and third pairs of electrodes, respectively, to maintain said inertial member suspended between said electrodes substantially at the center of said cavity, means for compensating for errors in the centering of said inertial member comprising:

means for generating a dither signal of a predetermined frequency and superimposing said dither signal upon the electric charge supplied by said first suspension servo channel;

means for detecting at the output of said second suspension servo channel, the presence of an error signal produced by cross-coupling of said dither signal; and means for receiving said error signal from said second suspension servo channel and providing a feedback to said second suspension servo channel so as to control the electric charge provided by said second suspension servo channel to said second pair of electrodes and thereby recenter said inertial member.

3. Apparatus according to claim 2, wherein provided further are means for detecting at the output of said third suspension servo channel the presence of an error signal produced by cross-coupling of said dither signal; and means for receiving said error signal from said third suspension servo channel and providing a feedback to said third suspension servo channel so as to control the electric charge provided by said third suspension servo channel to said second pair of electrodes and thereby recenter said inertial member.

4. Apparatus according to claim 3, wherein further provided are:

means for generating an alternate dither signal of an alternate predetermined frequency and superimposing said alternate dither signal upon the electric charge supplied by said second suspension servo channel;

means for detecting at the output of said first suspension servo channel the presence of an error signal produced by cross-coupling of said alternate dither signal; and means for receiving said error signal from said first suspension servo channel and providing a feedback to said first suspension servo channel so as to control the electric charge provided by said first suspension servo channel to said first pair of electrodes and thereby recenter said inertial member between said first pair of said electrodes.

* * * * *